Nov. 24, 1964 H. A. PAULSEN Re. 25,690

COMBINATION HALLWAY AND DISAPPEARING DRESSING ROOM

Original Filed Aug. 23, 1954

INVENTOR.
Harold A. Paulsen
BY
A. William Sturges
Agent

United States Patent Office

Re. 25,690
Reissued Nov. 24, 1964

25,690

COMBINATION HALLWAY AND DISAPPEARING DRESSING ROOM

Harold A. Paulsen, 546 S. 26th St., Omaha, Nebr.

Original No. 2,884,666, dated May 5, 1959, Ser. No. 451,485, Aug. 23, 1954. Application for reissue Oct. 6, 1959, Ser. No. 844,840
8 Claims. (Cl. 20—2)

Matter enclosed in heavy brackets [ ] appears in the original patent but forms no part of this reissue specification; matter printed in italics indicates the additions made by reissue.

*This invention relates to dwelling arrangement and more particularly it is an object of this invention to provide a dressing room made from a hallway as is my new concept.*

*A further object is to provide a dressing room made from a hallway which adjoins a bathroom for combination dressing room-bathroom facilities for a trailer dwelling or fixed dwelling.*

*Still another object is to provide a dressing room convertible from a hallway which latter adjoins both a bathroom and a bedroom for providing master suite accommodations.*

*A particular object is to provide master suite accommodations for more than one room with access to the combination hallway and dressing room.*

*The master suite feature, that is a bedroom having an adjoining dressing room with bathroom or powder room with lavatory, thereby provides a private dressing room, which is a feature having great living convenience usually only available in the more expensive homes.*

*However, the master suite feature of bedroom with adjoining dressing room and bath is usually affordable for only one bedroom even in homes of considerable cost.*

*It is the object of my invention to provide such a master suite, or master bedroom suite, accommodation for a plurality of bedrooms or other rooms of a dwelling, that is a fixed dwelling or a mobile or trailer dwelling, and to do so with far lesser and even insignificant cost than heretofore possible.*

The object of the combination hallway and disappearing dressing room of my invention is to provide a dressing room for a trailer, house, apartment, hotel suite, and other dwellings without adding a cubic inch of space to the structure and still giving full ceiling height in the area transformed from a hallway into a dressing room.

A further object of this invention is to accomplish the transformation from hallway to dressing room in a matter of seconds rather than minutes and in a like manner to return the hallway to its original form in a like short period of time.

Another object of this invention is to provide a dual purpose hall and dressing room for trailers, houses, apartments, hotels and other dwellings.

A particular object is to provide the facilities of a dressing room with vanity in an area of a trailer or other dwelling which is normally only used as a hallway.

A further object is to make possible the use of the hallway area of a trailer or other dwelling as a dressing room through the provision of doors which close off the ends of the hallway from the rooms at the ends of the hallway, which latter in the case of the house trailer are used as bedrooms at certain times.

A further object is to provide such a duel purpose hall and dressing room in combination with a vanity, which latter opens upon the hall.

Yet another object is to provide closets along one side of the hallway.

Midway from each end of the hallway it is an object to provide a recess extending transversely past an inner wall of the hall and into an area which in a trailer is normally used for closets. The recess is preferably of a size for receiving the legs of a person thereunder and further the recess is provided with suitable toe room for accommodating the toes of a person at times when such person is seated in the hallway.

A particular object is to provide a stool which latter preferably pivots at its lower end for folding inwardly for storage in the above-mentioned recess.

Another object is to provide a drawer disposed above the recess and adapted to be pulled outwardly into the hall.

Further objects are to have the vanity consist of a mirror inset into the wall, lights for the mirror, a light switch which operates the lights with the opening and closing of the doors and an electrical outlet disposed in the vicinity of the vanity preferably in one of the side walls of the recess. The doors are preferably provided with mirrors on their inner sides.

A further object is to have a closet door on the wall near the vanity and provided on its inner side with a mirror for full length viewing whereby the lights from the vanity will illuminate a person standing in the hall near the vanity and the vanity mirrors will cooperate in focusing light toward the person.

Another objective is to provide a vanity top formed of a slidable horizontal member mounted above the vanity drawer and recess for being pulled out into the hallway from a storage notch in the adjacent wall.

Yet another object is to provide such a dual purpose hall and dressing room in combination with a bath or powder room opening upon the hall preferably opposite the vanity for efficient arrangement with the lavatory conveniently placed near the vanity.

Yet a further object is to provide a cabinet wall opening from a position approximately opposite the vanity so as to be easily reached by a person while using the vanity.

Particularly it is an object to effect a saving of labor and material in constructing a dual purpose hall and dressing room as much space is saved.

Yet a further object is to give convenience by placing the doors of the closets and by placing the lavatory very near the built-in vanity, other service or storage space either at the built-in vanity or within reach of the person seated at the vanity.

Still another object is to be able to use the dressing room any time, day or night, without disturbing anyone sleeping in either bedroom.

*A further object is for occupants of either of two bedrooms to be able to gain entrance, first to a dressing room, and from it, gain entrance to a bathroom which is the proper entrance sequence for master suite accommodations. This sequence is believed impossible in narrow structures such as trailers without increasing their length, except by my new concept.*

*A further object is to make possible the removal of two vanity means from two bedrooms and to place one vanity means in my hallway-dressing room, thus gaining valuable space for each of two bedrooms and saving cost of one vanity.*

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
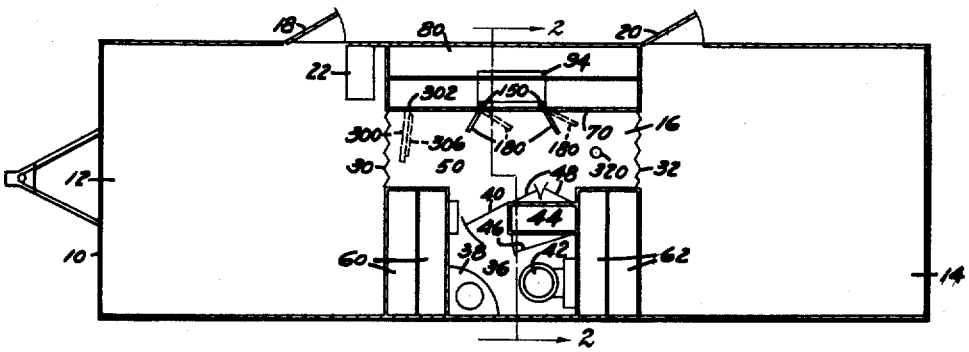
FIGURE 1 is a top plan view of a trailer house with the roof removed for showing the interior thereof. Only portions of the interior which are affected by this invention are shown in detail.

Referring to the drawings a house trailer *dwelling* is shown at 10, the latter having two rooms 12 and 14 in one or more of which sleeping accommodations are commonly provided, the latter not shown here. *Neither of the rooms 12 and 14 are primarily for hallway purposes and both are larger and wider than a hallway customarily is as best seen in FIGURE 1.* The trailer house 10 has a hallway *or hallway-dressing room* 16 interconnecting the rooms 12 and 14 and is also a common arrangement. The trailer house is provided with two doors 18 and 20 opening to the outside and a heater 22 is shown.

The new features of this invention will now be described. These features in combination provide an exceptionally efficient hallway and dressing room in the center portion of the trailer and it will be understood that this type of an arrangement can also be employed in housing units of types other than house trailers.

Referring specifically to FIGURE 1 it will be seen that in accordance with this invention the hallway 16 is provided with suitable openable closure means such as doors 30 and 32 at each end thereof or closing the hallway 16 off from the rooms 12 and 14.

The doors 30 and 32 are preferably of the folding type, sometimes called accordian-like doors although it will be understood that sliding doors and other types of doors could also be used.

Particularly the doors 30 and 32 should be of a type that shut by moving directly across the opening rather than being of a swinging type.

The facilities of good dressing room are to be found in the area 16 when it is considered further in combination with a bath or powder room 36 disposed on one side of the hallway 16 and having a lavatory 38 therein.

The powder room 36 is in communication with the hallway 16 through a *doorway having a* door 40 and the powder room 36 can have toilet facilities therein as seen at 42.

The powder room 36 is provided with a cabinet wall generally indicated at 44 which latter has a door 46 opening into the powder room 36 and has doors 48 opposite the door 46 and opening into the hallway 16 for access to the cabinet wall 44 and its shelves from both the former hallway which now shall be called a vanity area 50 and also from the powder room 36.

It will be seen that the vanity area 50 and the powder room 36 will form together with the many other later described facilities a dressing room of a very complete nature. The areas in the front and the rearward side of the powder room 36 are indicated at 60 and 62 respectively. These areas are for closet purposes and do not form a part of this invention.

Referring now to the upright wall 70 which is disposed opposite the powder room 36, it will be seen that this wall has behind it an area generally indicated at 80 and which is used as closet space as common practice in the design of trailers now in common use[.], *the closet having a clothes pole extending horizontally through the upper half thereof to support clothes in the usual vertical storage position.*

I propose to provide what I call a vanity recess 90, preferably disposed at the forward to rearward center of the wall 70, having on one side a leg opening through the upright wall 70 being provided with what I term a toe room 91 at the rearward lower portion of the recess 90 adjacent the floor of the trailer.

The recess 90 is separated from the closet space 80 by a back wall 92 and an upper wall 94 and also by an upper wall 96 and a back wall 102 of the toe room recess 91.

The wall 92 extends from the horizontal wall 94 downwardly to and is connected to the horizontal upper wall 96 of the toe room recess 91. The upper wall 96 is connected to the back wall 102 which latter extends downwardly to the floor of the trailer. The wall 94 extends to the vertical wall 70 adjacent the hallway 16.

The recess 90 is further provided with side walls 103 which latter in combination with the other walls above described completely separate the recess 90 from the closet area 80.

The vanity recess 90 is for the purpose of receiving the legs and toes of a person seated in the vanity area 50 in such a manner that the opening in the center of a desk receives the knees of a person sitting in front of it, the opening being further provided with a smaller recess which accommodates the toes of a person as well. In this fashion the vanity recess 90 with its walls 92, 94, 96, 102 and 103 is much like a piece of furniture although it is a built-in and integral part of the trailer.

The vanity recess 90 further has hinged doors 98 attached by hinges 100 to adjacent parts of the wall 70 and it will be understood that the recess 90 preferably has a rectangular opening through the wall 70.

At the top of the recess 90 is a drawer 104 having a handle 106 whereby it can be slid outwardly into the vanity area 50 like the drawer of a desk.

Above the drawer 104 is a vanity top 110 which is slidably mounted beneath the upper wall 94 of the vanity recess 90. The sliding top 110 functions in the same fashion as the top of a vanity furniture piece would. It is completely retractable into the wall or rather through the wall 70 for complete disappearance at times when the vanity area 50 is to be used as a hallway.

Above the vanity recess 90 is a mirror recess 120 which latter has a back wall 122 and an upper wall 124. The mirror recess 120 is much less deep than the vanity recess 90 and its inner wall 122 extends vertically up to its horizontal upper wall 124 which itself extends to the wall 70 and is connected therewith. The lower end of the vertical wall 122 is mounted upon and suitably attached to the upper wall 94 of the vanity recess 90.

Figure 3:
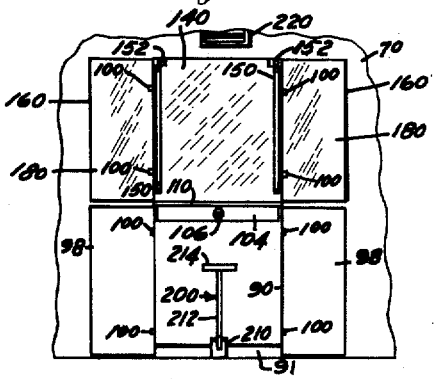
FIGURE 3 is a view of a section of a wall in the vanity area showing the vanity with its doors and mirrors in open position.

As best seen in FIGURE 3, the mirror recess 120 is preferably of rectangular shape and of about the same width as the vanity recess 90.

The inner wall 122 of the mirror recess 120 is provided with a mirrored surface 140 and lighting is provided preferably by elongated fluorescent tubes 150 disposed on the right and left hand sides of the mirror 140.

The mirror recess 120 is provided with doors 160 which hinge from the right and left hand side of the mirror recess 120, being attached to the wall 70 at the edges of the recess 120. The doors 160 close the recess 120 as best seen in FIGURE 4 as do also the doors 98 of the vanity recess 90, all four doors having suitable handles 170.

The fluorescent tubes 150 are provided with on-off pressure-type switches 152. The switches 152 are suitably disposed in a manner whereby the opening of the doors 160 will automatically cause the switches 152 to operate whereby the tubes 150 become lighted and upon closing the doors 160, the inner surfaces of the doors 160 come in contact with the push button of the switches 152, the fluorescent tubes 150 are automatically turned off.

On the inner side of the doors 160 mirrors 180 are provided so that the lady of the trailer can see the sides and back of her head while fixing her hair.

Figure 4:
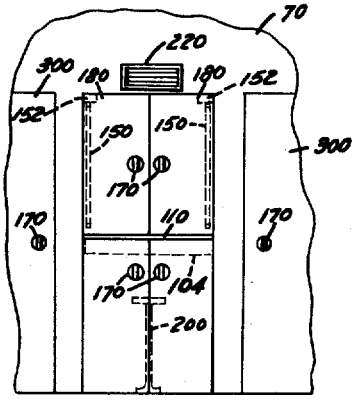
FIGURE 4 is a view similar to FIGURE 3 but with the vanity doors and mirrors in closed position.

As above described, it will be seen that the vanity may be closed off from the hallway and the wall 70 will assume the appearance of a continuous, unobstructed wall as best illustrated in FIGURE 4.

Figure 2:
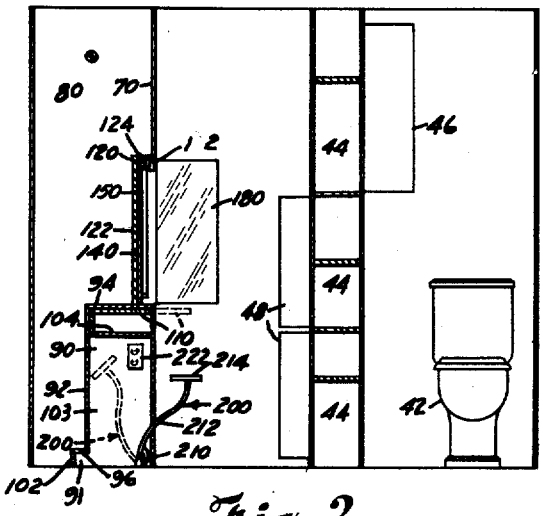
FIGURE 2 is a view-in-section taken along the line 2—2 of FIGURE 1, a stool being shown in use position in full lines and in storage position in dotted lines.

In the vanity recess 90 a stool 200 is provided which latter can be permanently attached to the trailer as by a fitting 210, which latter can be of any desired construction for permitting the pivoting of the standard portion 212 of the stool 200 in a transverse direction to be swung inwardly into the vanity recess 90 for storage in the dotted line position shown in FIGURE 2.

The fitting should also be of a construction suitable for preventing the outward swinging of the stool 200 beyond the full line position shown in FIGURE 2 in which a seat portion 214 of the stool 200 is horizontally disposed outwardly from the wall 70.

To make this possible the standard portion 212 of the stool 200 is preferably provided with a shape resembling the letter S when capitalized. The standard 212 is provided as seen from the vanity area 50 with a concave vanity area side in its lowermost portion and a convex area side in its upper most portion, and as best seen in FIGURE 2. The uppermost portion of the standard 212 connects at approximately a right angle to a seat portion 214.

A heating and air-conditioning outlet louver 220 is disposed in the wall 70 above the mirror doors 160.

The vanity area 50 is further provided with an electrical outlet 222 which latter is preferably disposed on one of the side walls 103 of the vanity recess 90 and below the drawer 104. The outlet 222 is provided for the convenient use of such electrical appliances as vibrating massage units and the like.

As best seen in FIGURE 1, a door 300 can be provided hingedly attached to the wall 70 as shown at 302, the door 300 swinging outwardly from the wall 70 and having on its normally inner side a mirror 306 whereby the mirror 306 can be used as a full length mirror by the lady of the trailer or other person standing in the vanity area 50.

It will be seen that instead of a door 300 a suitable mirror frame can be similarly hingedly mounted at 302 for swinging out into the hallway and for swinging again into or against the wall 70 for storage.

When the lady of the trailer wishes to use the full length mirror 306 to maximum advantage it is preferable that she stand in the position indicated by the small circle 320. In this position, light from the vanity light 150 can be directed toward her by placing the left mirror 180 in the dotted line position shown in FIGURE 1 whereby light from the right light 150 will strike the left mirror 180 after being reflected from the mirror 140 and will thereby be guided toward the lady at 320. Also, light from a left vanity lighting tube 150 is directed at the lady at 320 by the left mirror 180. The right mirror 180 will also serve to direct light toward the lady at 320. With the mirrors 180 in these positions the full length mirror 306 can be placed at an angle of approximately 110 degrees from the wall 70 and adequate full length mirror facilities will thereby be made available to the lady of the trailer in the dressing room combination.

As thus described it will be seen that the combination of the facilities mentioned provide an unusually complete dressing room having all vanity features including mirror and lighting facilities, top area and drawer, and closet space.

With the cabinet wall 44 disposed directly opposite the vanity recess 90, the cabinet wall area provides storage facilities as are necessary to a complete dressing room.

The lavatory 38 available for washing is also an important factor in the combination, being directly available to the lady of the trailer and being in the area which is made separate from the rest of the trailer by the doors 30 and 32 at the end of the combination hallway and dressing room.

It will also be seen that the above features are all incorporated into a combination hallway and dressing room with the utmost conservation of space which latter is usually at a premium in the common house trailer.

In operation, the dual purpose hallway and dressing room of this invention may be converted for use as a dressing room by first closing one or the other of the doors 30 or 32, then opening the doors 160 which automatically operate the switches 152 whereby the tubes 150 furnish light for the area. The opposite one of the doors 30 or 32 is then closed and the hallway becomes a dressing room, separated from the rooms 12 and 14.

The vanity recess 90 may be exposed by opening the doors 98 and the stool 200 is pulled outwardly thereof from its storage position as shown in dotted lines in FIGURE 2 into a use position shown in full lines in FIGURE 2.

When the lady of the trailer has finished in the dressing room, it may be reverted to a hallway by first swinging the stool 200 inwardly into the vanity recess 90 where it assumes its storage position. The doors 98 are closed and then one or the other of the doors 30 and 32 is opened whereupon the doors 160 are closed and the opposite one of the doors 30 and 32 is opened to complete the transformation from a dressing room to an unobstructed hallway 16.

For these reasons a trailer as described in the drawing and in the following claims is particularly adapted for carrying out the objects of the invention.

*It will be seen that when each room 12 and 14 is used as a bedroom, each bedroom has the ability of forming, with interconnection to the hallway-dressing room 16 and bathroom 36, a master suite accommodation or master bedroom suite accommodation exclusive of the other bedroom formed by the other of the rooms 12 or 14, whereby the dwelling 10 can be economically provided with a dressing room without addition to its floor area.*

*It will be seen that my arrangement is the first to make possible the master suite feature in a house trailer, the first to provide a multiple use hallway, and the first to provide these features in combination with an arrangement including a bathroom door 40 which can be closed to prevent condensation from collecting on and interfering with the use of the vanity mirror 180 and door mirror 306.*

*The term "dressing room equipment means" as used herein shall mean either: (1) vanity means or (2) vanity means plus storage means.*

*I make no claim to furniture features as such but use them herein to illustrate physically the differences between the historic hall that remains a hall and my hall that becomes a meaningful dressing room.*

From the foregoing description, it is thought to be obvious that a dual purpose hall and dressing room constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a trailer of a type having a [centrally disposed] hallway, a combination of features for transforming the hallway area into a dressing room at desired times, the said combination of features being as follows: the provision of operable closure means for closing each end of the hallway to separate the hallway area from the remainder of the trailer whereby the hallway area can serve as a dressing room, the trailer further having on one side of the hallway a closet area and being provided with a wall extending vertically and separating the closet area from the hallway, the said wall having a recess therethrough and extending into the closet area and disposed extending upwardly from the floor of the trailer, said recess being of a size for accommodating the knees and toes of a person sitting in the hallway whereby the recess through the wall serves as a part of a built-in vanity, mirror facilities mounted on the wall above said vanity recess, whereby substantially all of the floor space available for the use of the hallway as such is also available when the hallway is transformed into a dressing room.

2. The combination described in claim 1 which further includes a stool for use at said built-in vanity, said stool having a seat portion at its upper end and having a seat supporting portion extending downwardly from and attached to said seat portion, said seat supporting portion being elongated and having a lowermost portion offset inwardly of said recess at times when the upper end of said stool is in a use position with its seat portion disposed outwardly of said recess and in said hallway which is at such times being used as a dressing room, the lowermost end of said *seat* [stool] supporting portion being disposed inwardly of said recess, and means for pivotally attaching the lowermost end of said stool to the floor of said trailer in a manner for permitting said stool to pivot from a use position as described to a storage position inside said recess, and means for preventing said stool from pivotally moving outwardly of said recess and into said dressing room beyond a desired position for seating with its upper seating portion in approximately a horizontal position.

3. The construction defined in claim 1 which further includes a full length mirror hingedly attached to said vertical wall between said closet area and said hallway, said full length mirror swinging about a vertical axis at said hallway wall whereby it can be swung outwardly into said hallway to function as a part of said dressing room.

4. The combination described in claim 1 in which a drawer is provided in the upper portion of said recess and means is provided for supporting said drawer slidably whereby it can be pulled outwardly into said dressing room.

5. The combination described in claim 1 in which a top is slidably mounted in the upper end of said recess in a manner whereby it can be pulled outwardly of said recess into said hallway at times when it is desired to use the top as a vanity-desk type top.

6. In a trailer of a type having a [centrally disposed] hallway and a room disposed on one side of said hallway and containing a lavatory, and having a door between said hallway and said lavatory room, a combination of features for transforming the hallway area into a dressing room at desired times, the same said combination of features being as follows: the provision of openable closure means for closing each end of the hallway to separate the hallway area from the remainder of the trailer whereby the hallway area can serve as a dressing room, the trailer further having a closet area at a side of the hallway and having an upright wall separating the closet area from the hallway, the said wall having a leg opening therethrough and extending into the closet area and disposed extending upwardly from the floor of the trailer, said leg opening being of a size for accommodating therethrough the knees and toes of a person sitting in the hallway whereby the opening through the upright wall serves as a part of a built-in vanity, whereby the said lavatory room and hallway together form a dressing room at times when the hallway is transformed into a dressing room by the closing of the said closure means, whereby substantially all of the floor space available for use of the hallway and lavatory room when these are used separately is also available when transformation is made into a dressing room.

7. The combination described in claim 6 in which a cabinet wall is provided between said lavatory room and said hallway, said cabinet wall having doors on the hallway side thereof and also on the lavatory room side thereof, whereby said cabinet wall serves for the storage of those articles desired in a dressing room and further serves as a storage part of the said built-in vanity.

8. The combination of claim 6 in which a movable shelf is slidably mounted through said upright wall above said leg opening in a manner for extending outwardly into said hallway for use as the top of a vanity and forming a built-in vanity together with said leg opening and mounted in a manner for storage of said shelf in the area on the opposite side of said upright wall from said hallway.

References Cited by the Examiner

The following references, cited by the Examiner, are of record in the patented file of this patent or the original patent.

UNITED STATES PATENTS

| | | | |
|---|---|---|---|
| 623,008 | 4/99 | Heid. | |
| 735,277 | 8/03 | Lehmann. | |
| 854,171 | 5/07 | Merrill. | |
| 1,501,364 | 7/24 | Ovington | 20—1.11 |
| 1,580,661 | 4/26 | Funk et al. | |
| 1,698,981 | 1/29 | Ackerman. | |
| 1,747,480 | 2/30 | Newell. | |
| 2,087,695 | 1/37 | Miller. | |
| 2,239,272 | 4/41 | Patton | 105—315 |
| 2,293,267 | 8/42 | O'Brien | 20—1.11 |
| 2,481,148 | 9/49 | Patton | 105—315 |
| 2,589,894 | 3/52 | Ten Eyck. | |
| 2,590,045 | 3/52 | Schiff. | |
| 2,692,161 | 10/54 | Van Tassel. | |
| 2,757,418 | 8/56 | Bergstrom | 20—2 |

OTHER REFERENCES

Trailcar Cruiser, advertisement by Trailcar, Inc., Atlanta, Ga.

Glider Cara Coach, Condor Model (advertisement), Glider Trailer Co., 1824 West Kinzie St., Chicago 22, Ill.

Glider Trailer Coach, Albatross Model (advertisement), Glider Trailer Co., 1824 West Kinzie St., Chicago 22, Ill.

Trailer Dealer, December 1953, page 113 only.

JACOB L. NACKENOFF, *Primary Examiner.*

WILLIAM S. MUSHAKE, *Examiner.*